United States Patent
Kim et al.

(10) Patent No.: US 9,122,275 B2
(45) Date of Patent: Sep. 1, 2015

(54) ROBOT AND CONTROL METHOD THEREOF

(71) Applicant: SAMSUNG ELECTRONICS CO., LTD., Suwon (KR)

(72) Inventors: Ji Young Kim, Anyang (KR); Kwang Kyu Lee, Yongin (KR); Young Do Kwon, Yongin (KR); Kyung Shik Roh, Seongnam (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 129 days.

(21) Appl. No.: 13/738,409

(22) Filed: Jan. 10, 2013

(65) Prior Publication Data
US 2013/0178978 A1 Jul. 11, 2013

(30) Foreign Application Priority Data
Jan. 10, 2012 (KR) .................. 10-2012-0002955

(51) Int. Cl.
- *G05D 3/00* (2006.01)
- *B25J 9/00* (2006.01)
- *B25J 9/16* (2006.01)

(52) U.S. Cl.
CPC ... *G05D 3/00* (2013.01); *B25J 9/00* (2013.01); *B25J 9/16* (2013.01); *Y10S 901/14* (2013.01); *Y10S 901/27* (2013.01)

(58) Field of Classification Search
CPC ..... B25J 15/0009; B25J 9/1612; G06F 3/016; G06F 3/011; G06F 3/014; G05D 3/00; Y10S 901/14; Y10S 901/27
USPC .................. 700/251, 260–262; 901/30–36, 39
See application file for complete search history.

(56) References Cited

U.S. PATENT DOCUMENTS

| | | | |
|---|---|---|---|
| 5,086,400 A | 2/1992 | Hayati et al. | |
| 7,714,895 B2 | 5/2010 | Pretlove et al. | |
| 7,795,832 B2* | 9/2010 | Kawabuchi et al. | 318/568.11 |
| 8,346,393 B2* | 1/2013 | Kim et al. | 700/261 |
| 8,352,074 B2* | 1/2013 | Guochunxu et al. | 700/255 |
| 2003/0146898 A1* | 8/2003 | Kawasaki et al. | 345/156 |
| 2007/0142751 A1* | 6/2007 | Kang et al. | 600/587 |
| 2008/0059131 A1* | 3/2008 | Tokita et al. | 703/5 |
| 2009/0012532 A1* | 1/2009 | Quaid et al. | 606/130 |
| 2009/0231272 A1* | 9/2009 | Rogowitz et al. | 345/156 |
| 2010/0161130 A1* | 6/2010 | Kim et al. | 700/261 |
| 2011/0153076 A1* | 6/2011 | Noro | 700/245 |

FOREIGN PATENT DOCUMENTS

| | | |
|---|---|---|
| JP | 2005-169564 | 6/2005 |
| JP | 2009-18380 | 1/2009 |
| KR | 10-2010-0070987 | 6/2010 |

* cited by examiner

*Primary Examiner* — Jason Holloway
(74) *Attorney, Agent, or Firm* — Harness, Dickey & Pierce, P.L.C.

(57) ABSTRACT

A robot and method of controlling the same are provided. The robot includes a hand and an arm, a grip sensor unit configured to enable the hand to sense an object, a grip control unit configured to determine whether the hand grips the object from gripping information obtained from the grip sensor unit, select an object-based coordinate to control the hand and the arm based on a motion of the object or an independent coordinate to independently control the hand and the arm according to a result of the determination, and control the hand and the arm based on the selected coordinate, and a coordinate transformation unit configured to calculate a position and a direction of a virtual object based on the object-based coordinate, and deliver information about the position and the direction of the virtual object calculated to the grip control unit.

17 Claims, 8 Drawing Sheets

ROBOT AND CONTROL METHOD THEREOF

CROSS-REFERENCE TO RELATED APPLICATIONS

This application is related to, and claims priority to, Korean Patent Applications No. 10-2012-0002955, filed on Jan. 10, 2012 in the Korean Intellectual Property Office, the disclosure of which is incorporated herein by reference.

BACKGROUND

1. Field

Embodiments of the present disclosure relate to a robot capable of performing a task by delivering a motion of an arm and a hand of a user to the robot, and a control method thereof, and more particularly, to a robot using an object-based coordinate transformation, and a control method thereof.

2. Description of the Related Art

In general, a control of robot may be provided in such a manner that a motion of a user is represented by a motion of the robot.

That is, information of a motion of an arm of a user may be delivered to a robot arm, and the information of a motion of a hand of a user may be delivered to a robot hand.

Accordingly, the user may control the robot arm and the robot hand independent of each other.

However a separate manipulator may be required to independently control the robot arm and the robot hand, and thus, the working efficiency is lowered.

A position and a direction of an object recognized as being gripped by a user may be different from a position and a direction of the object actually being gripped by a robot hand.

Accordingly, a motion of the robot arm according to a motion of the arm of the user may interfere with a motion of the robot hand according to a motion of the hand of the user.

SUMMARY

It is an aspect of the present disclosure to provide a robot capable of independently controlling a robot arm and a robot hand in a free space, and after gripping an object, capable of controlling the robot arm and the robot hand based on an object-based coordinate, and a control method thereof.

Additional aspects of the disclosure will be set forth in part in the description which follows and, in part, will be obvious from the description, or may be learned by practice of the disclosure.

In accordance with an aspect of the present disclosure, a robot includes a robot hand, a robot arm, a grip sensor unit, a grip control unit, and a coordinate transformation unit. The grip sensor unit may be configured to enable the robot hand to sense an object. The grip control unit may be configured to determine whether the robot hand grips the object from an gripping information obtained from the grip sensor unit, select, according to a result of the determination, an object-based coordinate to control the robot hand and the robot arm based on a motion of the object or an independent coordinate to independently control the robot hand and the robot arm, and control the robot hand and the robot arm based on the selected coordinate. The coordinate transformation unit may be configured to calculate a position and a direction of a virtual object on the object-based coordinate, and deliver information about the position and the direction of the virtual object calculated to the grip control unit.

The grip control unit, if determined that the robot hand grips the object, may use the object-based coordinate, and maintain the robot in a state of gripping the object such that the robot is prevented from moving in response to a detailed motion of the user.

The object-based coordinate may be configured to calculate positions of a plurality of actual finger tips, calculate positions of a plurality of virtual finger tips by use of the positions of the plurality of actual finger tips calculated, and obtain a center position and a direction vector of the virtual object based on the positions of the plurality of virtual finger tips calculated.

The grip control unit may determine whether a relative change of a coordinate of the virtual object delivered from a master device or a slave device is a translation movement, a rotation movement or a gripping movement, and generate a translation control command according to the translation movement, a rotation control command according to the rotation movement or a grip control command according to the gripping movement.

The translation control command may be configured to determine whether the translation movement is a translation movement on an XY plane of the object-based coordinate, and if determined that the translation movement is not a translation movement on an XY plane of the object-based coordinate, the translation control command determines whether the robot hand is able to perform the translation movement in the z-axis of the object-based coordinate, thereby controlling the robot arm or the robot hand.

The rotation control command may be configured to determine whether the rotation movement is a rotation movement in an x-axis or a y-axis of the object-based coordinate, and if determined that the rotation movement is not a rotation movement in an x-axis or a y-axis of the object-based coordinate, the rotation control command may determine whether the robot hand is able to perform the rotation movement in the z-axis of the object-based coordinate, thereby controlling the robot arm or the robot hand.

The grip control command may be a command configured to control the robot hand.

In accordance with an aspect of the present disclosure, a method of controlling a robot includes determining whether a robot hand grips an object from a gripping information obtained from a grip sensor unit. According to a result of the determination, an object-based coordinate to control the robot hand and a robot arm based on a motion of the object or an independent coordinate to independently control the robot hand and the robot arm may be determined. The robot hand and the robot arm may be controlled based on the selected coordinate.

The object-based coordinate may calculate a position and a direction of a virtual object, and deliver information about the position and the direction of the virtual object calculated to a grip control unit.

The selecting of the coordinate may include using the object-based coordinate if determined that the robot hand grips the object, and maintaining the robot in a state of gripping the object such that the robot is prevented from moving in response to a detailed motion of the user.

The object-based coordinate may be configured to calculate positions of a plurality of actual finger tips, calculate positions of a plurality of virtual finger tips by use of the positions of the plurality of actual finger tips calculated, and obtain a center position and a direction vector of the virtual object based on the positions of the plurality of virtual finger tips calculated.

The selecting of the object-based coordinate may be achieved by determining whether a relative change of a coordinate of the virtual object delivered from a master device or a slave device is a translation movement, a rotation movement or a gripping movement. A translation control command according to the translation movement, a rotation control command according to the rotation movement or a grip control command according to the gripping movement may be generated.

The translation control command may be configured to determine whether the translation movement is a translation movement on an XY plane of the object-based coordinate, and if determined that the translation movement is not a translation movement on an XY plane of the object-based coordinate, the translation control command may determine whether the robot hand is able to perform the translation movement in the z-axis of the object-based coordinate, thereby controlling the robot arm or the robot hand.

The rotation control command may be configured to determine whether the rotation movement is a rotation movement in an x-axis or a y-axis of the object-based coordinate, and if determined that the rotation movement is not a rotation movement in an x-axis or a y-axis of the object-based coordinate, the rotation control command may determine whether the robot hand is able to perform the rotation movement in the z-axis of the object-based coordinate, thereby controlling the robot arm or the robot hand.

The grip control command may be a command configured to control the robot hand.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
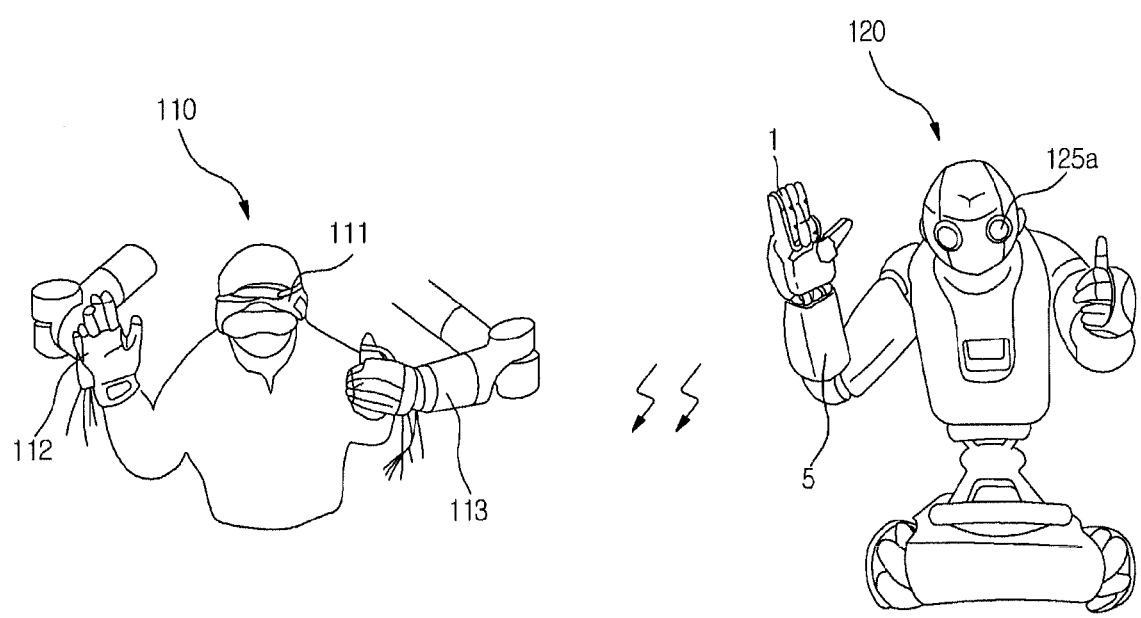
FIG. 1 illustrates a robot in accordance with an embodiment of the present disclosure.

Reference will now be made in detail to the embodiments of the present disclosure, examples of which are illustrated in the accompanying drawings, wherein like reference numerals refer to like elements throughout.

FIG. 1 illustrates a robot in accordance with an embodiment of the present disclosure.

Referring to FIG. 1, a robot in accordance with an embodiment of the present disclosure includes a master device 110 manipulated by a user, and a slave device 120 configured to perform a task in a remote area.

A display unit 111 may be paired with a camera sensor unit 125a of the slave device 120. The display unit 111 may display image information obtained from the camera sensor unit 125a of the slave device 120 to a user.

A master hand 112 may be paired with a robot hand 1 of the slave device 120. The master hand 112 may deliver coordinate information of a hand of a user to the robot hand 1.

For example, the master hand 112 in accordance with an embodiment of the present disclosure may be implemented with an apparatus including a glove-like apparatus to measure joint angles of fingers combined to an exoskeleton actuator structure so as to provide a force feedback. The master hand may be implemented with an exoskeleton structure including a link that serves as a sensor as well as an actuator.

A master arm 113 may be paired with a robot arm 5 of the slave device 120. The master arm 113 may deliver coordinate information of an arm of a user to the robot arm 5.

Figure 2:
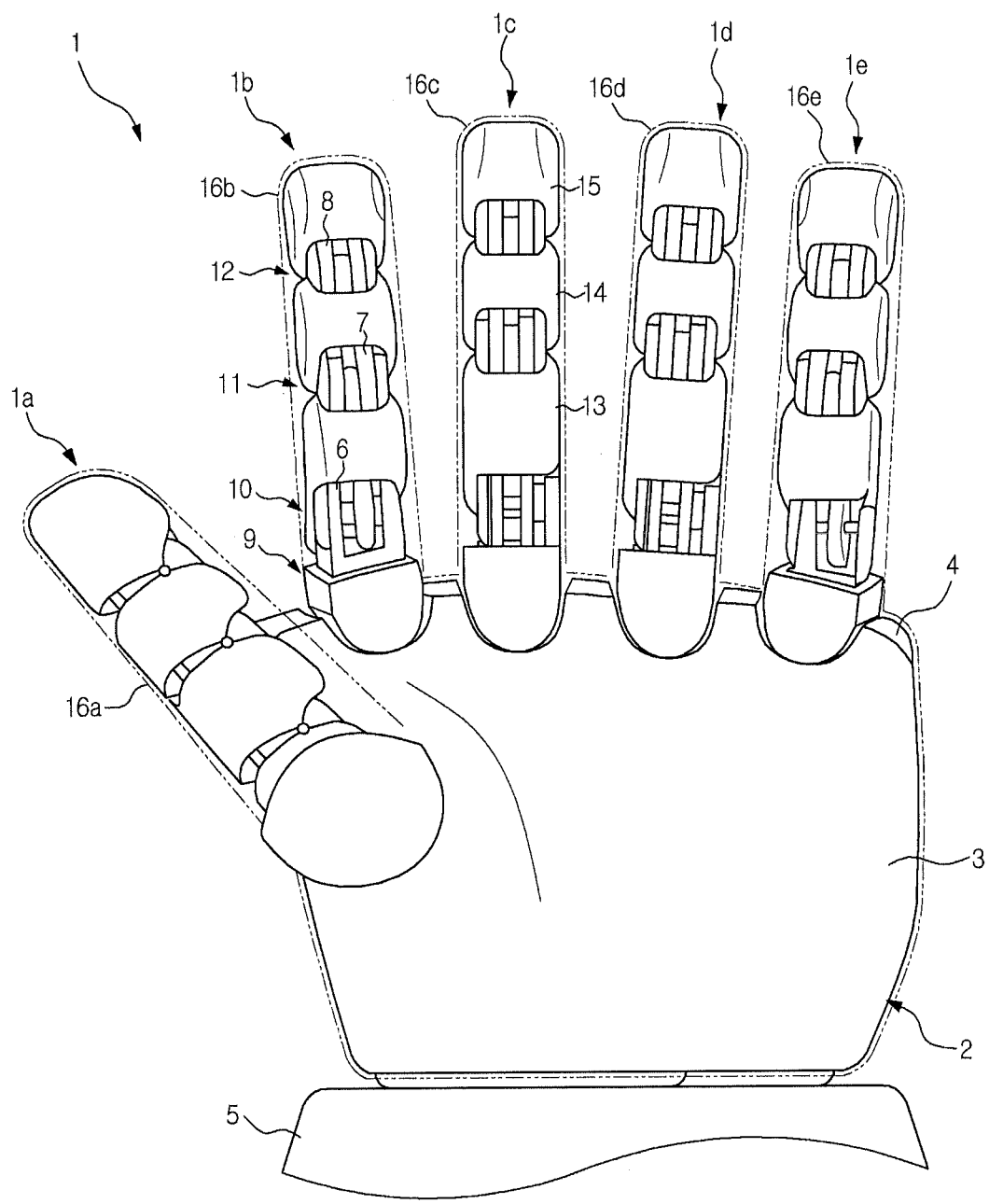
FIG. 2 illustrates a palm side of a robot hand in accordance with an embodiment of the present disclosure.

FIG. 2 illustrates a palm side of a robot hand in accordance with an embodiment of the present disclosure.

Referring to FIG. 2, the robot hand 1 in accordance with the embodiment of the present disclosure may include five finger mechanisms 1a to 1e extending from a hand-shape part 2 in a similar manner as a human hand. The finger mechanisms 1a to 1e may correspond to a thumb, an index finger, a middle finger, a ring finger and a little finger of a human, respectively.

The hand-shape part 2 may include a palm forming member 3 and a backhand forming member 4. An accommodating part of a driving mechanism to operate the finger mechanisms 1a to 1e may be provided at a gap between the palm forming member 3 and the backhand forming member 4. One side of the hand-shape part 2 may be connected to the robot arm 5.

Each of the finger mechanisms 1a to 1e includes three units 6, 7 and 8 of joint connecting members, and four units 9, 10, 11 and 12 of joints. Alternatively, the finger mechanisms 1a to 1e may include two or more units of joint connecting members and three or more units of joints.

The joint 9, among the joints 9 to 12 of the finger mechanisms 1a to 1e, which is connected to the palm may be rotatably installed. The finger mechanisms 1a to 1e may be open to lateral sides according to the rotation of the joint 9.

The respective joints 10 to 12 of the finger mechanisms 1a to 1e may be configured to rotate in the same direction. The joint connecting members 6 to 8 may be each configured to be rotatable on an axis of each of the joints 10 to 12. Accordingly, the finger mechanism 1a to 1e may perform a bending motion according to the rotation of the joint connecting members 6 to 8 at the respective joints 10 to 12.

The finger mechanisms 1a to 1e may perform a bending motion and a rotation motion through a driving element, such as an electric motor, and a power transmission mechanism, such as a wire or a pulley.

Buffer members 13 to 15 may be installed on the joint connecting members 6 to 8 of the finger mechanisms 1a to 1e while covering outer circumferential surfaces of the joint connecting members 6 to 8.

Elastic cover members 16a to 16e for fingers may be detachably provided at the finger mechanisms 1a to 1e so as to cover the surfaces of the finger mechanisms 1a to 1e as well as the buffer members 13 to 15.

Figure 3:
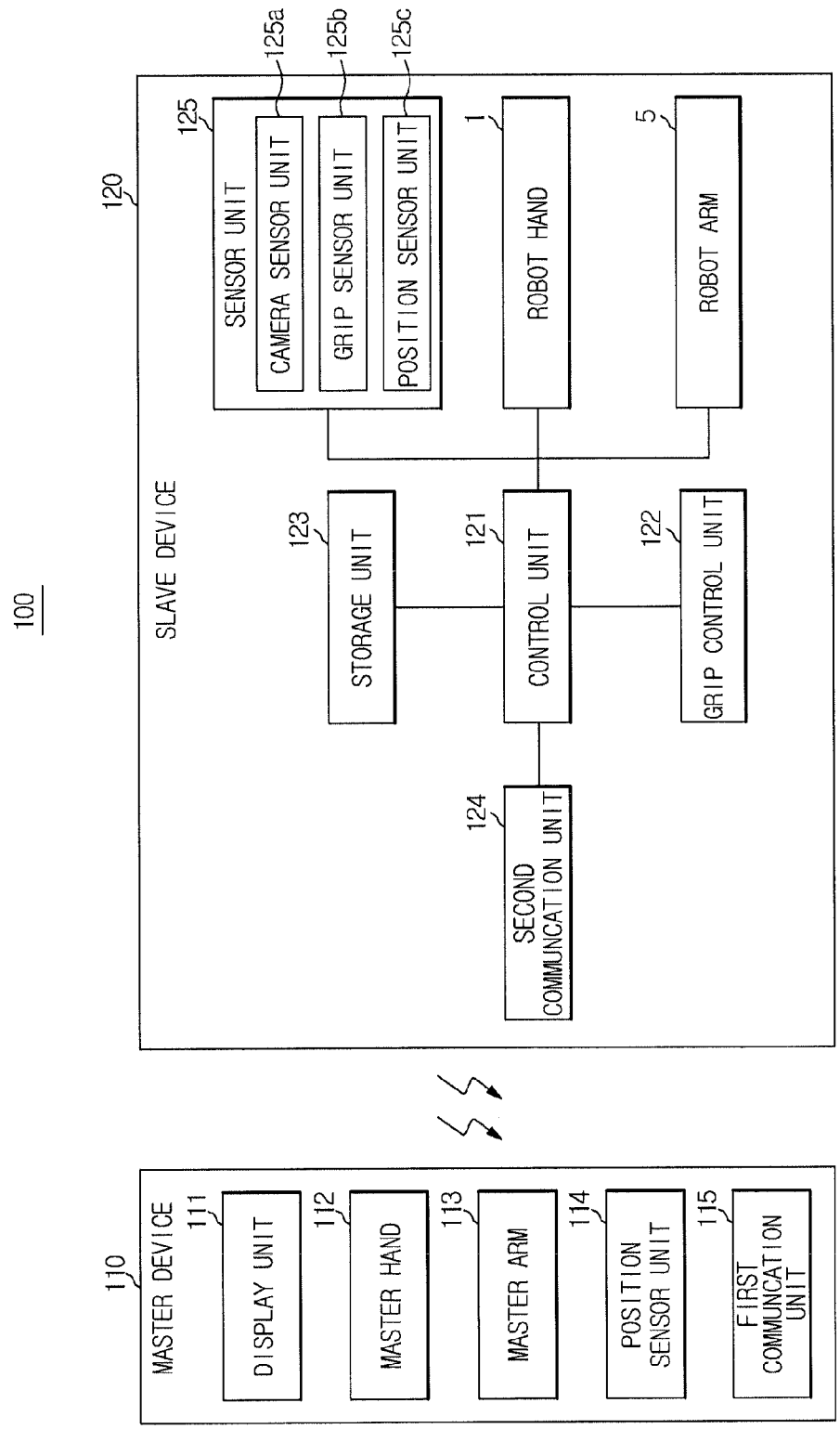
FIG. 3 illustrates a robot in accordance with an embodiment of the present disclosure.

FIG. 3 illustrates a robot in accordance with an embodiment of the present disclosure.

Referring to FIG. 3, the robot 100 may include a master device 110 and a slave device 120.

The master device 110 is an apparatus that may provided at a user side, and a user may control the slave device 120 by use of the master device 110. The master device 110 may include the display unit 111, the master hand 112, the master arm 113, a position sensor unit 114 and a first communication unit 115.

The display unit 111 may correspond to a head part of the robot, and may be configured to display an image recognized by the slave device 120.

For example, the display unit 111, while recognizing a motion of a head of a user, may display the image of a remote site, for example, a Head Mounted Display (HMD).

A user may control the slave device 120 based on the image obtained from the robot.

The master hand 112 corresponds to the robot hand 1 of the slave device 120, and refers to an apparatus to sense the motion of a user.

For example, the master hand 112, may sense the motion of the hand of the user to measure a joint angle of the finger, and generate coordinate information according to the motion.

The master arm 113 corresponds to the robot arm 5 of the slave device 120, and refers to an apparatus to sense the motion of the arm of the user.

For example, the master arm 113 may sense the motion of the arm of the user to measure a joint angle of the arm, and generate coordinate information according to the motion.

The master hand 112 and the master arm 113 may sense the motion of the user independently or in cooperation with each other, to transmit the coordinate information of the master hand 112 and the coordinate information of the master arm 113 to the slave device 120.

The position sensor unit 114 may sense the positions of the master hand 112 and the master arm 113 of the user side. The position sensor unit 114 may sense the positions of the master hand 112 and the master arm 113 by use of a sensor, for example, an encoder, mounted at the master hand 112 and the master arm 113, and transmit information related to the sensed position to a grip control unit 122 or a coordinate transformation unit (not shown).

The first communication unit 115 may exchange data with a second communication unit 124 of the slave device 120. The data transmission/reception scheme may be implemented in a wired or wireless manner.

The slave device 120 is a robot apparatus that operates according to control by a user. The slave device 120 includes a control unit 121, the grip control unit 122, a storage unit 123, the second communication unit 124, a sensor unit 125, the robot hand 1 and the robot arm 5.

The control unit 121 may control the operation of the slave device 120 according to coordinate information obtained from the master device 110. In addition, the control unit 121 may control the overall operation of the master device 110 and the slave device 120.

The grip control unit 122, in order to transform a reference coordinate, may determine whether the robot hand 1 grips an object. Requirements for transformation include determining whether the robot hand 1 grips an object with a sufficient force. The reaction force with respect to an object caused by a contact or a grip is analyzed through a grip sensor unit 125b installed on the finger tip of the robot hand 1, thereby determining whether the robot hand 1 grips an object.

When the robot hand 1 grips an object, the grip control unit 122 may transform the reference coordinate to an object-based coordinate. The grip control unit 122 may prevent some motions of the user from being represented, for example, by use of a predetermined stiffness or above, so that the robot hand 1 is prevented from missing the object gripped.

The grip control unit 122 may include the coordinate transformation unit (not shown) that is required for transforming into the object-based coordinate.

The object-based coordinate refers to a coordinate defined by calculating positions of a plurality of actual finger tips, calculating positions of a plurality of virtual finger tips by use of the positions of the plurality of actual finger tips calculated, and obtaining a center position and a direction vector of a virtual object based on the positions of the plurality of virtual finger tips calculated.

An object-based coordinate may be applied when the robot is controlled based on the motion of a virtual object regardless of a motion of the hand and the arm of the user, and when a size of motion of an object is small as in gripping and releasing the object.

When a user moves by overcoming a predetermined size of force to release an object, and thus the requirement for gripping is not satisfied, the grip control unit 122 may transform the reference coordinate to the independent coordinate that is configured to separately transmit the motions of the hand and arm of a user to the robot hand and the robot arm.

The independent coordinate may be applied when the size of the motion of the robot is large as in raising the arm.

The storage unit 123 may store various forms of motion of the robot hand 1 and the robot arm 5. The storage unit 123 may store various items of coordinate data being transmitted from the slave device 120 and the master device 110.

The second communication unit 124 may exchange data with the first communication unit 115 of the master device 110. The data transmission/reception scheme may be implemented in a wired or wireless manner.

The sensor unit 125 may include the camera sensor unit 125a to photograph a surrounding environment at the remote site, the grip sensor unit 125b to sense whether the robot hand 1 grips an object, and a position sensor unit 125c to sense the positions of the robot hand 1 and the robot arm 5.

The camera sensor unit 125a may obtain an image of a surrounding environment at a remote area and transmit the image to the display unit 111 at the user side. The camera sensor unit 125a may include a general camera configured to photograph a surrounding environment.

The grip sensor unit 125b may enable the robot hand 1 to sense an object, and transmit grip information related to the sensing to the grip control unit 122.

For example, a sensor (not shown) may be provided at positions p1 to p5 of tips of the respective finger mechanisms 1a to 1e sense whether the robot grips an object.

In addition, the sensor (not shown) may include a force sensor or a tactile sensor.

The force sensor may detect a force of the robot hand 1. The detecting of force of the robot hand 1 may be achieved by a conversion of a force to an electrical quantity that may include using the deformation of an elastic body as a first conversion factor, and equating a measured value with the magnitude of force, for example, that is already known.

The tactile sensor may replicate the sensation of skin and the force/torque sensation derived from a living body. The tactile sensor may include a contact sensor, a contact force sensor, a slip sensor, a force/torque sensor (a weight sensor), a proximity sensor or a stiffness sensor.

The tactile sensor may be implemented in the form of a tactile sensor array.

The position sensor unit 125c, for example, at the side of the slave device 120 may sense the positions of the robot hand 1 and the robot arm 5 of the slave device 120. The position sensor unit 125c may sense the positions of the robot hand 1 and the robot arm 5 of the slave device 120 by use of a sensor, for example, an encoder installed on the robot hand 1 and the robot arm 5 of the slave device 120, and transmit the position information to the grip control unit 122 or the coordinate transformation unit (not shown).

The robot hand 1 may perform a motion to grip an object and a motion to move an object.

The robot arm 5 may perform a motion such that the coordinate of the robot hand 1 is changed.

The robot arm 5 may have one end thereof connected to the robot hand 1, and the other end thereof connected to the torso of the robot the same manner as the structure of the arm of a human. The robot arm may have a structure different from that of the arm of a human.

Figure 4:
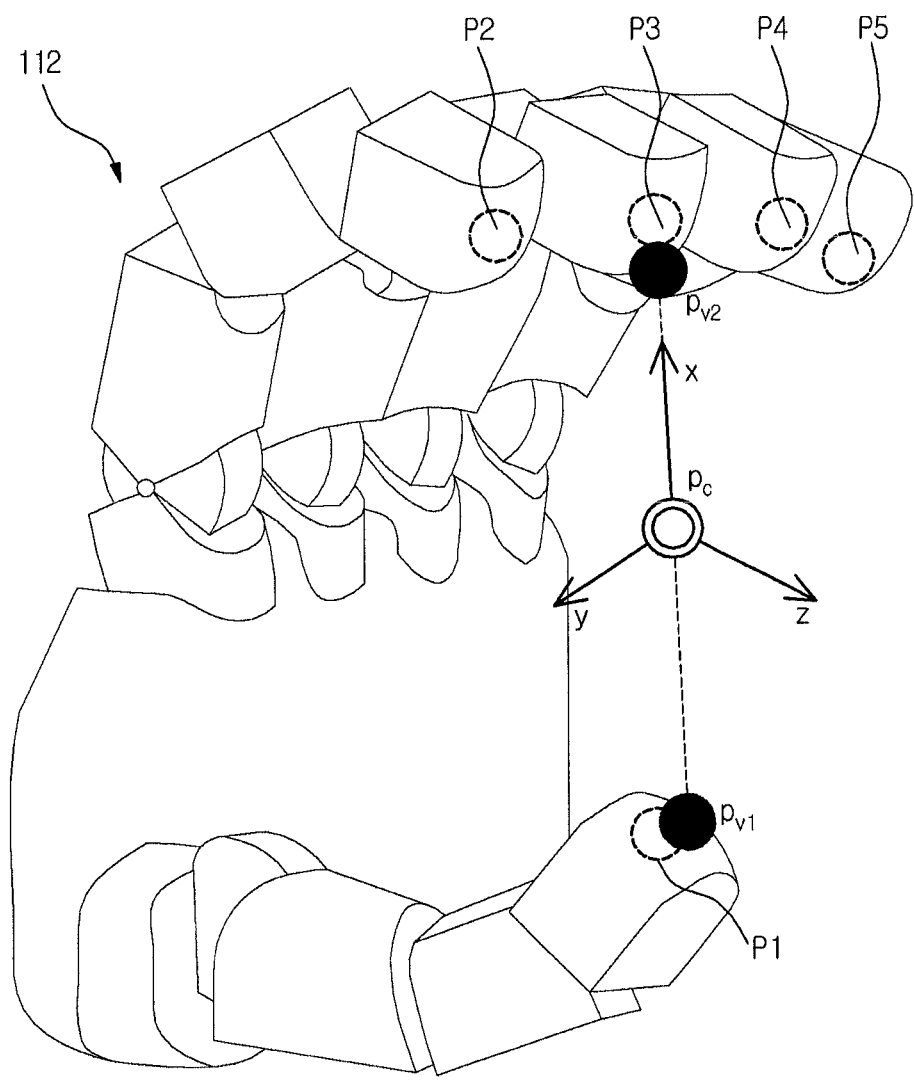
FIG. 4 illustrates a conversion from five actual finger tips to two virtual finger tips at a master hand in accordance with an embodiment of the present disclosure.

FIG. 4 illustrates a conversion from actual five finger tips to two virtual finger tips at a master hand in accordance with an embodiment of the present disclosure.

Referring to FIG. 4, positions of actual finger tips of the master hand 112 may be denoted as P1, P2, P3, P4 and P5, respectively. A position Pv1 of a first virtual finger tip may be set to a position P1 of the first actual finger tip of the master hand 112. A position Pv2 of a second virtual finger tip may be set to a center Pv2 of positions P2 to P5 of the second to the fifth actual finger tips.

The position Pv1 of the first virtual finger tip may be mapped to the position P1 of the first actual finger tip in one to one correspondence. The position Pv2 of the second virtual finger tip may be mapped to the positions P2 to P5 of the second to fifth actual fingers in one to four correspondence.

A center position between the position Pv1 of the first virtual finger tip and the position Pv2 of the second virtual finger tip may be obtained. The center position obtained may be referred to as a center position Pc of a virtual object.

On the object-based coordinated, an X-axis direction refers to a direction headed from the center position Pc of the virtual object to the position Pv2 of the second virtual finger tip while taking the center position Pc of the virtual object as an original point. On the object-based coordinate, a Y-axis direction refers to a direction headed from the position Pv2 of the second virtual finger tip to the position P2 of the second actual finger tip while taking the center position Pc of the virtual object as an original point. On the object-based coordinate, a Z-axis direction refers to a direction perpendicular to the X-axis and the Y-axis on the object-based coordinate while taking the center position Pc of the virtual object as an original point, and may be also referred to as a direction headed from the palm of the master hand 112 to the center position Pc of the virtual object. The X-axis, the Y-axis and the Z-axis may represent the X-axis, the Y-axis and the Z-axis on the object-based coordinate.

Although the description of the master hand 112 in accordance with an embodiment may be made in relation to a case where the position Pv2 of the second virtual finger tip is the center position of the positions P2 to P5 of the second to fifth actual finger tips, the present disclosure is not limited thereto. According to an embodiment, the position Pv2 of the second virtual finger tip may refer to a position adjacent to one of the positions P2 to P5 of the second to fifth actual finger tips.

Although the description of the master hand 112 in accordance with the embodiment may be made in relation to a case that the positions P2 to P5 of the second to fifth actual finger tips are converted to a position Pv2 of a single virtual finger tip, the present disclosure is not limited thereto. According to another embodiment, the position of at least one actual finger tips may be converted to a position Pv2 of a single virtual finger tip.

Figure 5:
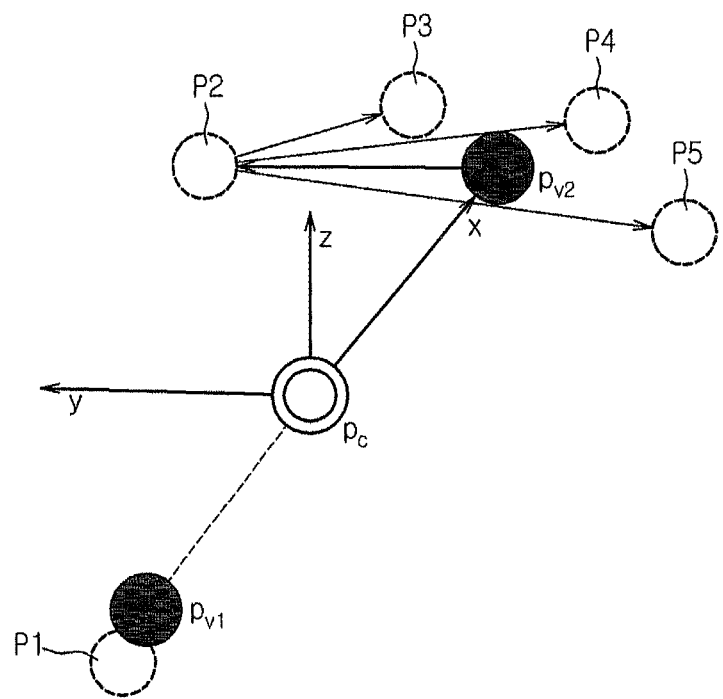
FIG. 5 illustrates an acquisition of an object-based coordinate of a robot in accordance with an embodiment of the present disclosure.

FIG. 5 illustrates an acquisition of an object-based coordinate of a robot in accordance with an embodiment of the present disclosure.

The coordinate transformation unit (not shown) may obtain the center position Pc of the virtual object through mathematical formula 1 as follows:

$$Pv1 = P1 \quad \text{[Mathematical Formula 1]}$$

In the mathematical formal 1, Pv1 may be defined as the position of the first virtual finger tip, and P1 as the position of the first actual finger tip.

The position Pv1 of the first virtual finger tip has a coordinate value of the position P1 of the first actual finger tip.

$$Pv2 = \frac{(P2 + P3 + P4 + P5)}{4} \quad \text{[Mathematical Formula 2]}$$

In the mathematical formula 2, Pv2 is the position of the second virtual finger tip of the master hand 112, and P2 to P5 refer to the positions of the second to fifth actual finger tips of the master hand 112.

The position Pv2 of the second virtual finger tip has an average value of coordinate values of the positions P2 to P5 of the second to fifth actual finger tips.

$$Pc = \frac{(Pv1 + Pv2)}{2} \quad \text{[Mathematical Formula 3]}$$

In the mathematical formula 3, Pv1 and Pv2 refer to the positions of the first and second virtual finger tips of the master hand 112, respectively, and Pc refers to the center position of the virtual object.

The center position Pc of the virtual object has an average value of coordinate values of the position Pv1 of the first virtual finger tip and the position Pv2 of the second virtual finger tip.

The coordinate transformation unit (not shown) obtains the direction vector of the virtual object through the following mathematical formula 4.

$$x1 = Pv2 - Pv1 \quad \text{[Mathematical Formula 4]}$$

In the mathematical formula 4, Pv1 and Pv2 refer to the positions of the first and second virtual finger tips of the master hand 112, respectively, and x1 refers to a temporary vector value used to obtain a vector value of the X-axis.

The vector x1 has a value of the position Pv2 of the second virtual finger tip minus the position Pv1 of the first virtual finger tip.

$$x = \frac{x1}{|x1|} \quad \text{[Mathematical Formula 5]}$$

In the mathematical formula 5, x1 refers to a temporary vector value used to obtain a vector value of the X-axis, and x refers to the vector value of the X-axis.

A unit vector x is obtained.

$$y1 = P2 - Pv2 \quad \text{[Mathematical Formula 6]}$$

In the mathematical formula 6, P2 is the position of the second actual finger tip of the master hand 112, Pv2 is the position of the second virtual finger tip, and y1 is a temporary vector value used to obtain a vector value of the Y-axis.

The vector y1 has a value of the position P2 of the second actual finger tip minus the position Pv2 of the second virtual finger tip.

$$y = \frac{y1}{|y1|} \quad \text{[Mathematical Formula 7]}$$

In the mathematical formula 7, y1 is a temporary vector value used to obtain a vector value of the Y-axis, and y is the vector value of the Y-axis.

A unit vector y is obtained.

$$z1 = x \times y \quad \text{[Mathematical Formula 8]}$$

In the mathematical formula 8, x is the vector value of the X-axis, z1 is a temporary vector value used to obtain a vector value of the Z-axis.

The vector z1 has a value of an outer product of the vector x and the vector y.

$$z = \frac{z1}{|z1|} \quad \text{[Mathematical Formula 9]}$$

In the mathematical formula 9, z1 is a temporary vector value used to obtain a vector value of the Z-axis, and z is the vector value of the Z-axis.

A unit vector z is obtained.

$$y1 = z \times x \quad \text{[Mathematical Formula 10]}$$

In the mathematical formula 10, x is the vector value of the X-axis, z is the vector value of the Z-axis, and y1 is the temporary vector value used to obtain the vector value of the Y-axis.

The vector y1 has a value of an outer produce of the vector z and the vector x.

$$y = \frac{y1}{|y1|} \quad \text{[Mathematical Formula 11]}$$

In the mathematical formula 11, y1 is the temporary vector value used to obtain the vector value of the Y axis, and y is the vector value of the Y-axis.

A unit vector y is obtained.

The object-based coordinate calculated in the mathematical formulas 1 to 11 is a result calculated based on a coordinate system fixed to the palm of the master hand 112.

Accordingly, if the coordinate (position and direction) of the palm of the master hand 112 with respect to the fixed coordinate system is calculated along with above, the position and the direction of the virtual object gripped by the master hand 112 may be estimated.

As the coordinate transformation unit (not shown) transmits information on a relative change of the virtual object calculated as such to the grip control unit 122, the grip control unit 122 determines the motions of the robot arm 5 and the robot hand 1 according to the relative variation of the virtual object.

Although the coordinate transformation unit (not shown) in accordance with the embodiment of the present disclosure obtains the position and direction of the virtual object at the master device 110 manipulated by a user, the present disclosure is not limited thereto. According to another embodiment, the position and direction of the virtual object may be obtained at the slave device 120, and data related to the position and direction obtained may be transmitted to the grip control unit 122.

For example, the master hand 112 of the master device 110 may be replaced with the robot hand 1 of the slave device 120. Accordingly, the coordinate transformation unit (not shown) may obtain the position of the virtual finger tip from the position of the actual finger tip of the robot hand 1, obtain the center position of the virtual object from the position of the virtual finger tip, and based on the center position of the virtual object obtained, estimate the position and the direction of the virtual object gripped by the robot hand 1. The coordinate transformation unit (not shown) may transmit information on a relative change of the virtual object to the grip control unit 122.

Figure 6:
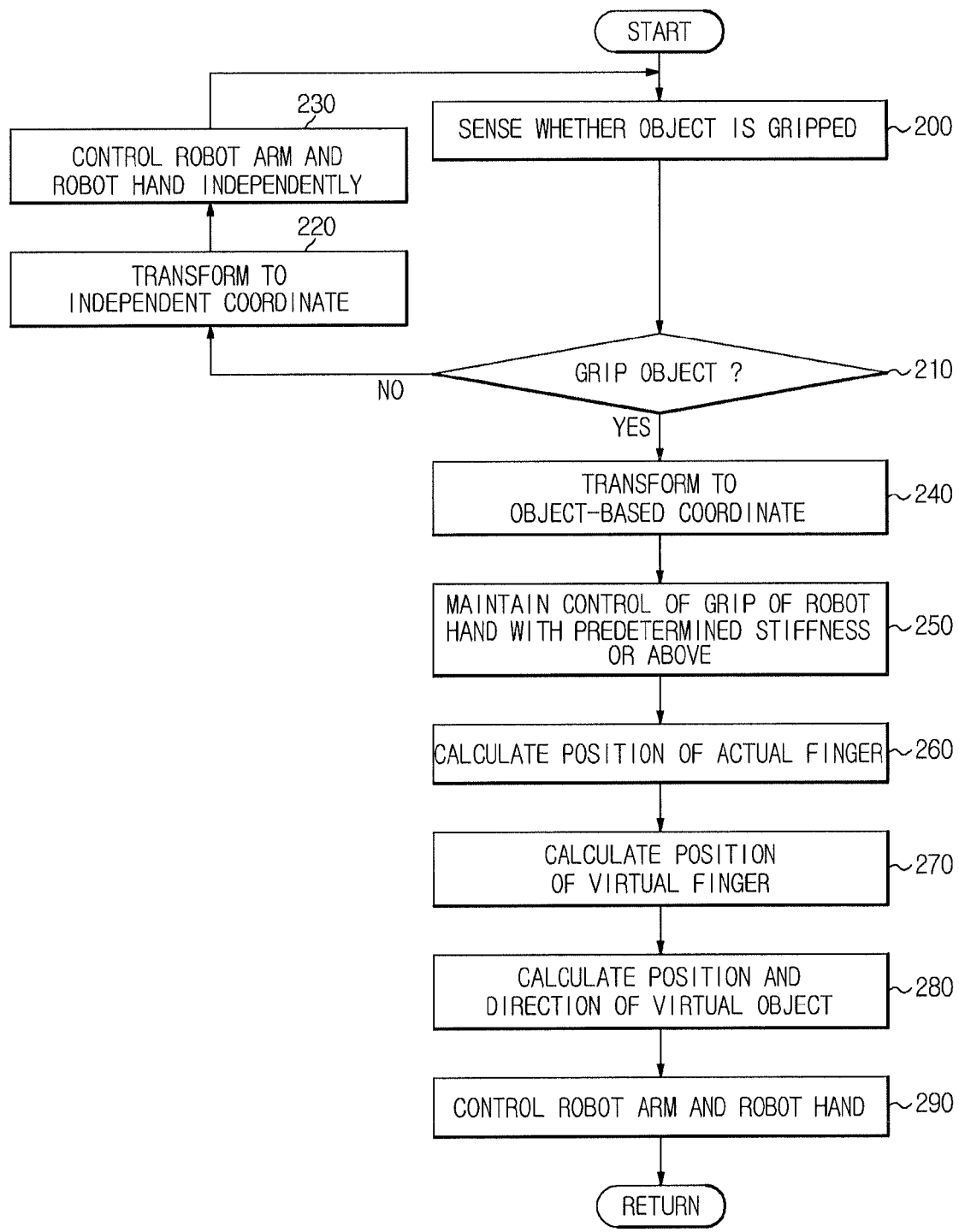
FIG. 6 illustrates a method of controlling a robot in accordance with an embodiment of the present disclosure.

FIG. 6 illustrates a method of controlling a robot in accordance with an embodiment of the present disclosure.

A method of controlling a robot in accordance with an embodiment of the present disclosure is described with reference to FIGS. 1 to 5.

The grip sensor unit 125b may enable the robot hand 1 to sense an object (200).

The grip control unit 122, based on gripping information obtained from the grip sensor unit 125b, determines whether the robot hand 1 grips an object, (210).

The grip control unit 122, if determined that the robot hand 1 does not grip an object, transforms the reference coordinate to an independent coordinate configured to control the robot hand 1 and the robot arm 5 independent of each other (220).

The grip control unit 122 may control the robot arm 5 and the robot hand 1 independent of each other (230).

That is, the grip control unit 122 may transmit the coordinate information of the arm of the user and the coordinate information of the fingers of the user to the robot arm 5 and the robot hand 1, respectively.

The grip control unit 122, if determined that the robot hand 1 grips an object, transforms the reference coordinate to an object-based coordinate configured to control the robot hand 1 and the robot arm 5 based on a motion of an virtual object (240).

That is, the grip control unit 122, after the object is gripped, may organically move the robot arm 5 and the robot hand 1 based on the object-based coordinate.

When a user controls the slave device 120 according the control method in accordance with the embodiment, the grip control unit 122 may recognize a point of time to grip an object and perform a task, and after the point of time, analyze an intention of the manipulation of a virtual object by a user and generate a command corresponding to the intention.

As a result, an intention of a user to work by moving the arm and hand is applied to a gripping and manipulating task of the slave device 120, thereby enhancing the working efficiency.

After the reference coordinate is transformed to the object-based coordinate, the grip control unit 122 prevents a motion of a user from being represented with respect to a detailed motion of the user by use of a predetermined stiffness or above, so that the robot hand 1 does not miss the object and maintains a state of gripping the object (250).

If a user moves by overcoming a predetermined size of force to release the object, and thus the requirement for gripping is not satisfied, the grip control unit 122 may transform the reference coordinate to the independent coordinate configured to separately transmit the coordinates of the hand and arm of the user to the robot hand and the robot arm.

The coordinate transformation unit (not shown) may calculate the positions of the actual finger and the virtual finger of the master hand 112 from the position information being transmitted from the position sensor unit 114 (260 and 270). The sensor unit 114 may sense the positions of the master hand 112 and the master arm 113 from the sensor, for example, an encoder installed on the master hand 112 and the master arm 113, and transmit information related to the positions to the coordinate transformation unit.

The position sensor unit 114 may transmit the position information of each of the actual finger tips of the master hand 112 to the coordinate transformation unit (not shown).

Referring to FIG. 4, positions of actual finger tips of the master hand 112 may be denoted as P1, P2, P3, P4 and P5, respectively.

The coordinate transformation unit (not shown) may set a position Pv1 of a first virtual finger tip to a position P1 of the first actual finger tip of the master hand 112. A position Pv2 of a second virtual finger tip may be set to a center Pv2 of positions P2 to P5 of the second to the fifth actual finger tips.

A position Pv1 of the first virtual finger tip is mapped to the position P1 of the first actual finger tip in one to one correspondence. A position Pv2 of the second virtual finger tip is mapped to the positions P2 to P5 of the second to fifth actual fingers in one to four correspondence.

A center position between the position Pv1 of the first virtual finger tip and the position Pv2 of the second virtual finger tip may be obtained. The center position obtained may be referred to as a center position Pc of a virtual object.

Although the description of the master hand 112 in accordance with an embodiment may be made in relation to a case where the position Pv2 of the second virtual finger tip is the center position of the positions P2 to P5 of the second to fifth actual finger tips, the present disclosure is not limited thereto. According to an embodiment, the position Pv2 of the second virtual finger tip may refer to a position adjacent to one of the positions P2 to P5 of the second to fifth actual finger tips.

Although the description of the master hand 112 in accordance with the embodiment may be made in relation to a case that the positions P2 to P5 of the second to fifth actual finger tips are converted to a position Pv2 of a single virtual finger tip, the present disclosure is not limited thereto. According to another embodiment, the position of at least one actual finger tips may be converted to a position Pv2 of a single virtual finger tip.

The coordinate transformation unit (not shown) may calculate the position and the direction of the virtual object (280).

The center position Pc and the direction vector of the virtual object may be obtained through the mathematical formulas 1 to 11.

The coordinate of the center position Pc of the virtual object calculated in the mathematical formulas 1 to 11 is a result calculated based on a coordinate system fixed to the palm of the master hand 112.

Accordingly, if the coordinate (position and direction) of the palm of the master hand 112 with respect to the fixed coordinate system is calculated along with above, the position and the direction of the virtual object gripped by the master hand 112 may be estimated.

As the coordinate transformation unit (not shown) transmits information on a relative change of the virtual object calculated to the grip control unit 122, the grip control unit 122 generates commands to move the robot arm 5 and the robot hand 1 according to the relative variation of the virtual object (290).

Although the coordinate transformation unit (not shown) in accordance with the embodiment of the present disclosure obtains the position and direction of the virtual object at the master device 110 manipulated by a user, the present disclosure is not limited thereto. According to an embodiment, the position and direction of the virtual object may be obtained at the slave device 120, and data related to the position and direction obtained may be transmitted to the grip control unit 122.

For example, the master hand 112 of the master device 110 may be replaced with the robot hand 1 of the slave device 120. Accordingly, the coordinate transformation unit (not shown) may obtain the position of the virtual finger tip from the position of the actual finger tip of the robot hand 1, obtain the center position of the virtual object from the position of the virtual finger tip, and based on the center position of the virtual object obtained, estimate the position and the direction of the virtual object gripped by the robot hand 1. The coordinate transformation unit (not shown) may transmit information on a relative change of the virtual object to the grip control unit 122.

Figure 7:
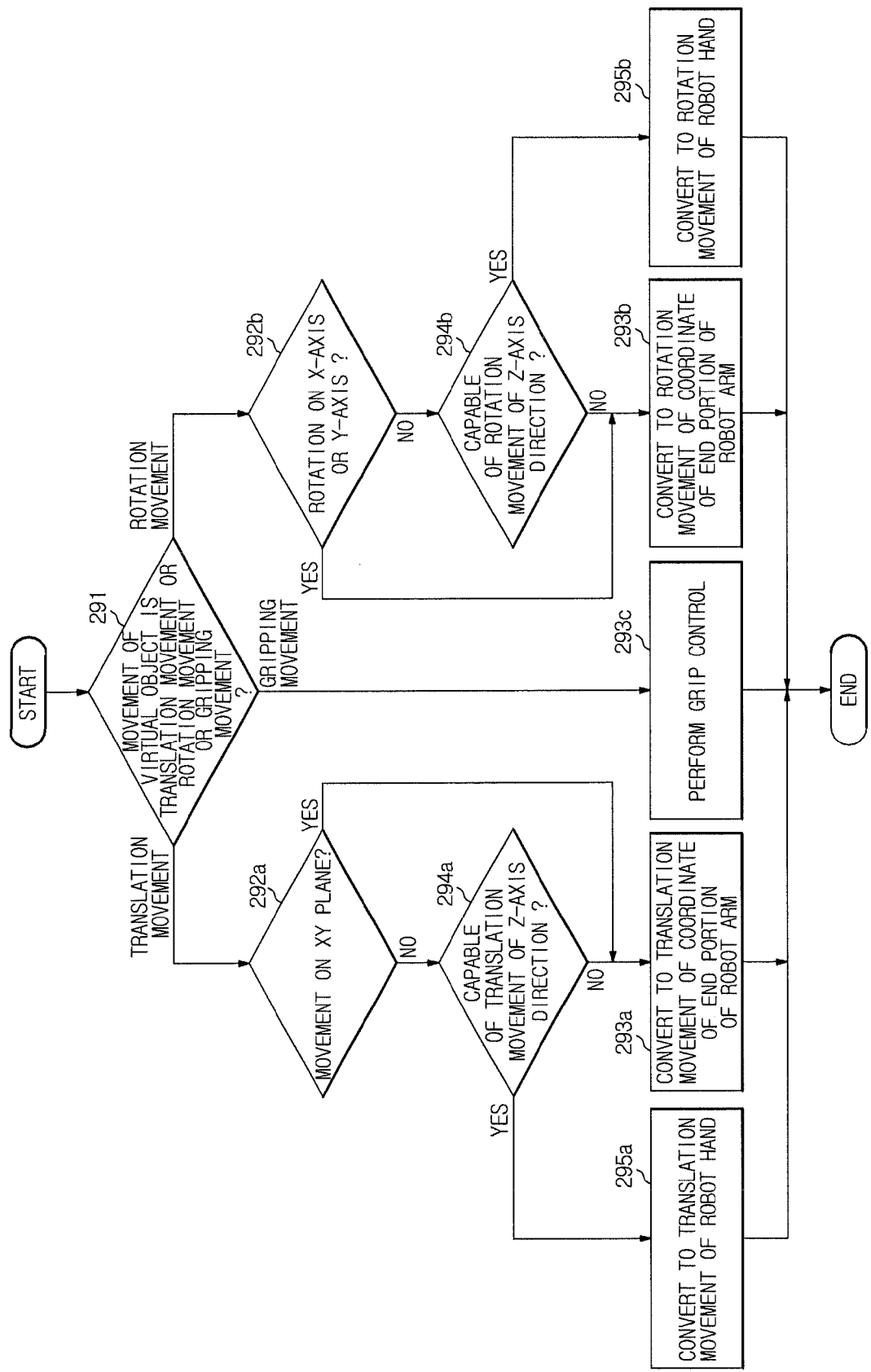
FIG. 7 illustrates an exemplary control of a robot arm and a robot hand on an object-based coordinate in a method of controlling a robot in accordance with an embodiment of the present disclosure.

FIG. 7 illustrates a control of the robot arm and the robot hand in an object-based coordinate in a method of controlling a robot in accordance with an embodiment of the present disclosure.

The grip control unit 122 may determine whether the relative change (movement) of the coordinate of the virtual object delivered from the master device 110 is a translation movement, a rotational movement or a gripping movement (291).

The X-axis, the Y-axis and the Z-axis may represent the X-axis, the Y-axis and the Z-axis on the object-based coordinate, respectively.

A translation movement in accordance with an embodiment of the present disclosure will be described. The grip control unit 122 may determine whether a translation movement of the virtual object is a translation movement on the XY plane of the object-based coordinate (292*a*).

Referring to FIG. 4, the robot hand 1 may have a difficulty in representing the translation movement on the XY plane of the object-based coordinate. Accordingly, if the translation movement of the virtual object is a translation movement on the XY plane of the object-based coordinate, the grip control unit 122 converts the translation movement on the XY plane to a translation movement at a coordinate of an end portion of the robot arm (293*a*).

On the contrary, if determined that a translation movement of the virtual object is not a translation movement on the XY plane of the object-based coordinate, the grip control unit 122 may determine whether the robot hand 1 is able to perform a translation movement of the Z-axis direction (294*a*).

That is, if the change of the translation in the Z-axis direction is small or the robot hand 1 is able to perform a translation movement of the Z-axis direction, the grip control unit 122 may convert the translation movement of the virtual object to a translation movement of the robot hand 1 (295*a*).

For example, if the change of the translation in the Z-axis direction is small, the robot hand 1 is able to perform a translation movement of the Z-axis direction in a state of maintaining a gripping surface with respect to the object, or the current joint configuration of the robot fingers is present while taking a sufficient area within a workspace, the grip control unit 122 may convert the translation movement of the virtual object to a movement of the fingers of the robot hand 1.

However, if the change of the translation in the Z-axis direction is large, or the robot hand 1 is unable to perform a translation movement of the Z-axis direction, the grip control unit may convert the translation movement to a translation movement of a coordinate of an end portion of the robot arm 5 (293*a*).

For example, if the change of the translation in the Z-axis direction is greater, the robot hand 1 may be unable to perform a translation movement of the Z-axis direction in a state of maintaining a gripping surface with respect to the object, or the robot fingers has a difficulty in movement at the current joint configuration even when the robot hand 1 is able to perform the corresponding translation movement, the grip control unit may convert the translation movement of the virtual object to a translation movement of a coordinate of an end portion of the robot arm 5.

The grip control unit 122 may change the position of the Z-axis of the finger tip involving the gripping movement, together with a grip control algorithm.

A rotation movement in accordance with an embodiment of the present disclosure will be described.

The grip control unit 122 may determine whether a rotation movement of the virtual object is a rotation movement on the X-axis or the Y-axis (292*b*).

Referring to FIG. 4, the robot hand 1 may have difficulty in representing the rotation movement on the X-axis or the Y-axis. Accordingly, the grip control unit 122 converts the rotation movement of the virtual object to a rotation movement of a coordinate of an end portion of the robot arm (293*b*).

If it is determined that a rotation movement of the virtual object is not a rotation movement on the X-axis or the Y axis, the grip control unit 122 may determine whether the robot hand 1 is able to perform a rotation movement of the Z-axis direction (294*b*).

If the robot hand 1 is able to perform a rotation movement on the Z-axis, the grip control unit 122 converts the rotation movement of the virtual object to a rotation movement of the robot hand 1 (295*b*).

For example, if the change of the rotation in the Z-axis direction is small, the robot hand may be able to perform a rotation movement of the Z-axis direction in a state of maintaining a gripping surface with respect to the object, or the current joint configuration of the robot fingers is present while taking a sufficient area within a workspace, the grip control unit 122 may convert the rotation movement of the virtual object to a movement of the fingers of the robot hand 1.

if the robot hand 1 is unable to perform a rotation movement on the Z-axis, the grip control unit 122 may convert the rotation movement of the virtual object to a rotation movement of a coordinate of an end portion of the robot arm 5 (293*b*).

For example, if the change of the rotation in the Z-axis direction is large, the robot hand 1 may be unable to perform a rotation movement of the Z-axis direction in a state of maintaining a gripping surface with respect to the object, or the robot fingers has a difficulty in movement at the current joint configuration even when the robot hand 1 is able to perform the corresponding rotation movement, the grip control unit may convert the rotation movement of the virtual object to a rotation movement of a coordinate of an end portion of the robot arm 5.

The grip control unit 122 may enable the finger tip involving the gripping movement to conduct a circumferential motion on the Z-axis, together with a grip control algorithm.

A gripping movement in accordance with an embodiment of the present disclosure will be described.

The grip control unit 122, if determined that the relative change of the coordinate of the virtual object being transmitted is a gripping movement, may perform a control of gripping (293*c*).

The gripping movement may include a motion to open and close the fingers in a manner similar to thongs. For example, the gripping movement may include a motion starting from a preparation of the control of gripping to an actual gripping of an object, a motion to open the hand to release the object in a state of gripping, or a motion to grip the object harder.

Figure 8:
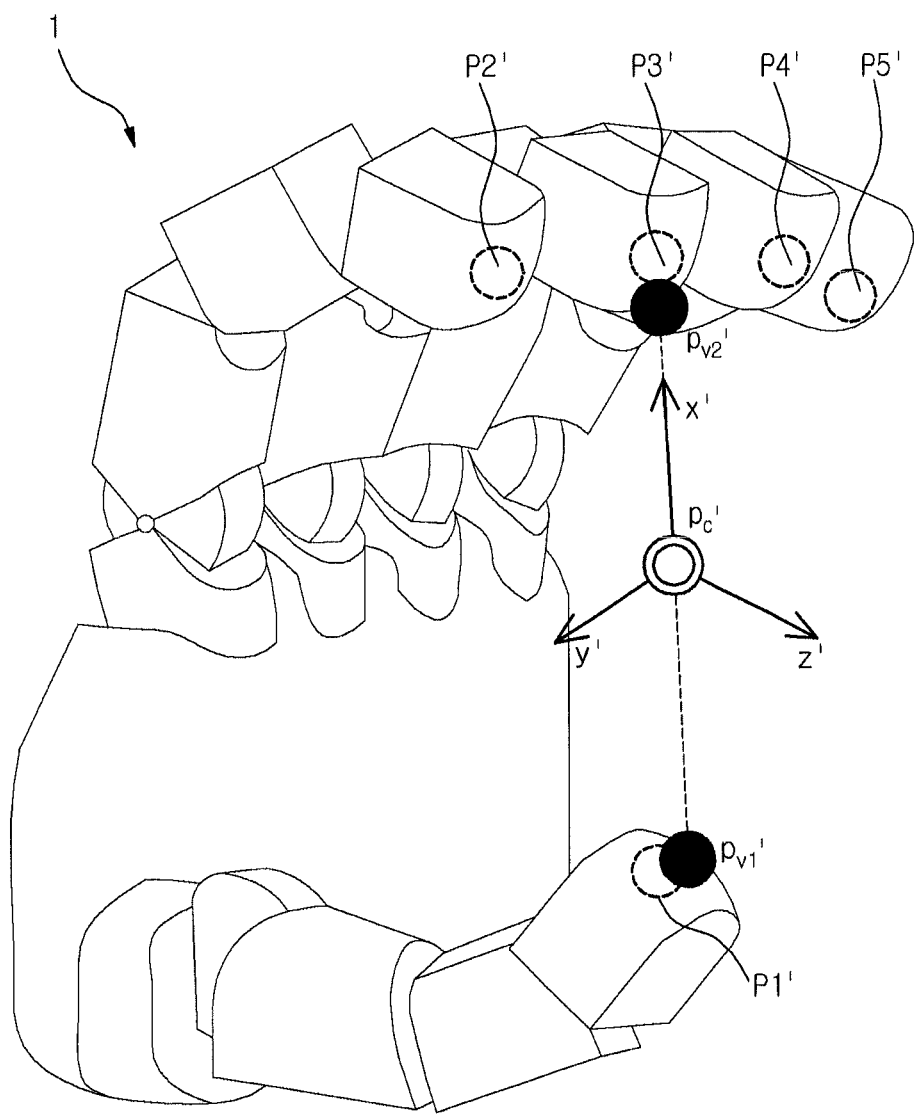
FIG. 8 illustrates a robot hand having two virtual finger tips converted from five actual finger tips in accordance with an embodiment of the present disclosure.

An exemplary control of gripping is disclosed with reference to FIG. 8.

FIG. 8 illustrates a robot hand having two virtual finger tips converted from five actual finger tips on the robot hand in accordance with an embodiment of the present disclosure.

Referring to FIG. 8, positions of actual finger tips of the robot hand 1 may be denoted as P1', P2', P3', P4' and P5', respectively.

A position Pv1' of a first virtual finger tip may be set to a position P1' of the first actual finger tip. A position Pv2' of a second virtual finger tip may be set to a center Pv2' of positions P2' to P5' of the second to the fifth actual finger tips.

A position Pv1' of the first virtual finger tip of the robot hand 1 may be mapped to the position P1' of the first actual finger tip in one to one correspondence A position Pv2' of the second virtual finger tip may be mapped to the positions P2' to P5' of the second to fifth actual fingers in one to four correspondence.

A center position between the position Pv1' of the first virtual finger tip and the position Pv2' of the second virtual finger tip is obtained. The center position obtained may be referred to as a center position Pc' of a virtual object.

As the first virtual finger tip and the second virtual finger tip of the robot hand 1 move toward the center position Pc' of the virtual object based on the center position Pc' of the virtual object, the virtual object (not shown) is gripped.

When the first virtual finger tip and the second virtual finger tip of the robot hand 1 move toward the center position Pc' of the virtual object based on the center position Pc' of the virtual object, the first virtual finger tip and the second virtual finger tip move while keeping a relative positional relation between the position Pv1' of the first virtual finger tip and the position Pv2' of the second virtual finger tip constant the center position Pc' of the virtual object.

As the second virtual finger tip of the robot hand 1 moves with respect to the center position Pc' of the virtual object, the positions P2' to P5' of the actual finger tips may move while keeping a relative positional relation with respect to the position Pv2' of the second virtual finger tip.

For example, the motion to open the hand to release the object and the motion to grip the object harder at the gripping state may operate the same manner as above.

Although the description of the robot hand 1 in accordance with an embodiment where the position Pv2' of the second virtual finger tip is the center position of the positions P2' to P5' of the second to fifth actual finger tips is disclosed, the present disclosure is not limited thereto. According to another embodiment, the position Pv2' of the second virtual finger tip may refer to a position adjacent to one of the positions P2' to P5' of the second to fifth actual finger tips.

Although the description of the robot hand 1 in accordance with an embodiment may be made in relation to a case that the positions P2' to P5' of the second to fifth actual finger tips are converted to a position Pv2' of a single virtual finger tip is disclosed, the present disclosure is not limited thereto. According to an embodiment, a position of at least one actual finger tips may be converted to a position Pv2' of a single virtual finger tip.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A robot comprising:
   a robot hand and a robot arm each configured to receive instructions from a master device based on respective movement of a master hand and a master arm by a remote user of the robot;
   a grip sensor unit configured to enable the robot hand to sense an object;
   a grip control unit configured to,
      determine whether the robot hand grips the object at a sufficient force to hold the object from a gripping information obtained from the grip sensor unit,
      select, according to a result of the determination, one of two coordinate systems to utilize to control the robot hand and the robot arm based on whether the determining determines that robot hand is gripping the object at the sufficient force, the two coordinate systems including an object-based coordinate and an independent coordinate, the object-based coordinate configured to control the robot hand and the robot arm based on a motion of a virtual object representing an estimate of a motion of the object such that the robot hand and the robot arm move indirectly based on the estimated motion of the object rather than directly to the instructions from the remote user via the movement of the master hand and the master arm, respectively, and the independent coordinate is configured to independently control the robot hand and the robot arm such that the robot hand and robot arm respond directly to the instructions from the remote user via the movement of the master hand and the master arm, respectively, and
      control the robot hand and the robot arm based on the selected coordinate and the instructions received from the user; and
   a coordinate transformation unit configured to calculate a position and a direction of the virtual object on the object-based coordinate, and configured to deliver information about the position and the direction of the virtual object calculated to the grip control unit.

2. The robot of claim 1, wherein the grip control unit, if determined that the robot hand grips the object, selects the object-based coordinate and prevents motions of the user from being represented by use of a predetermined stiffness or above such that the robot hand is prevented from missing the object gripped.

3. The robot of claim 1, wherein the object-based coordinate is configured to calculate positions of a plurality of actual finger tips, calculate positions of a plurality of virtual finger tips by use of the positions of the plurality of actual finger tips calculated, and obtain a center position and a direction vector of the virtual object based on the positions of the plurality of virtual finger tips calculated.

4. The robot of claim 1, wherein the grip control unit determines whether a relative change of a coordinate of the virtual object delivered from a master device or a slave device is a translation movement, a rotation movement or a gripping movement, and generates a translation control command according to the translation movement, a rotation control command according to the rotation movement or a grip control command according to the gripping movement.

5. The robot of claim 4, wherein the translation control command is configured to determine whether the translation movement is a translation movement on an XY plane of the object-based coordinate, and if determined that the translation movement is not a translation movement on an XY plane of the object-based coordinate, the translation control command determines whether the robot hand is able to perform the translation movement in the z-axis of the object-based coordinate, and controls the robot arm or the robot hand.

6. The robot of claim 4, wherein the rotation control command is configured to determine whether the rotation movement is a rotation movement in an x-axis or a y-axis of the object-based coordinate, and if determined that the rotation movement is not a rotation movement in an x-axis or a y-axis of the object-based coordinate, the rotation control command determines whether the robot hand is able to perform the rotation movement in the z-axis of the object-based coordinate, and controls the robot arm or the robot hand.

7. The robot of claim 4, wherein the grip control command is a command configured to control the robot hand.

8. A method of controlling a robot, the method comprising:
   receiving instructions from a master device based on a respective movement of a master hand and a master arm by a remote user of the robot;
   determining, by a processor, whether the robot hand grips an object at a sufficient force to hold the object from a gripping information obtained from a grip sensor unit;
   selecting, by the processor, according to a result of the determination, one of two coordinate systems to utilize to control the robot hand and the robot arm based on whether the determining determines that robot hand is gripping the object at the sufficient force, the two coordinate systems including an object-based coordinate and an independent coordinate, the object-based coordinate configured to control the robot hand and a robot arm based on a motion of a virtual object representing an estimate of a motion of the object such that the robot hand and the robot arm move indirectly based on the estimated motion of the object rather than directly to the instructions from the remote user via the movement of the master hand and the master arm, respectively, and the independent coordinate independently controls the robot hand and the robot arm such that the robot hand and robot arm respond directly to the instructions from the remote user via the movement of the master hand and the master arm, respectively;
   controlling, by the processor, the robot hand and the robot arm based on the selected coordinate and the instructions received from a remote user of the robot; and
   at the object-based coordinate, calculating a position and a direction of the virtual object, and delivering information about the position and the direction of the virtual object calculated to a grip control unit.

9. The method of claim 8, wherein the selecting of the coordinate comprises:
   selecting the object-based coordinate if determined that the robot hand grips the object, and preventing motions of the user from being represented by use of a predetermined stiffness or above such that the robot hand is prevented from missing the object gripped.

10. The method of claim 8, wherein the object-based coordinate is configured to calculate positions of a plurality of actual finger tips, calculate positions of a plurality of virtual finger tips by use of the positions of the plurality of actual finger tips calculated, and obtain a center position and a direction vector of the virtual object based on the positions of the plurality of virtual finger tips calculated.

11. The method of claim 8, wherein the selecting of the object-based coordinate comprises:
- determining whether a relative change of a coordinate of the virtual object delivered from a master device or a slave device is a translation movement, a rotation movement or a gripping movement; and
- generating a translation control command according to the translation movement, a rotation control command according to the rotation movement or a grip control command according to the gripping movement.

12. The method of claim 11, wherein the translation control command is configured to determine whether the translation movement is a translation movement on an XY plane of the object-based coordinate, and if determined that the translation movement is not a translation movement on an XY plane of the object-based coordinate, the translation control command determines whether the robot hand is able to perform the translation movement in the z-axis of the object-based coordinate, and controls the robot arm or the robot hand.

13. The method of claim 11, wherein the rotation control command is configured to determine whether the rotation movement is a rotation movement in an x-axis or a y-axis of the object-based coordinate, and if determined that the rotation movement is not a rotation movement in an x-axis or a y-axis of the object-based coordinate, the rotation control command determines whether the robot hand is able to perform the rotation movement in the z- axis of the object-based coordinate, and controls the robot arm or the robot hand.

14. The method of claim 11, wherein the grip control command is a command configured to control the robot hand.

15. A grip control device for a robot connected to master device, the master device including a master hand and a master arm controlled by a remote user, the grip control device comprising:
- a grip sensor unit configured to enable a robot hand to sense an object;
- a grip control unit configured to,
  - determine whether the robot hand grips the object at a sufficient force to hold the object from a gripping information obtained from the grip sensor unit,
  - select, according to a result of the determination, one of two coordinate systems to utilize to control the robot hand and the robot arm based on whether the determining determines that robot hand is gripping the object at the sufficient force, the two coordinate systems including an object-based coordinate and an independent coordinate, the object-based coordinate configured to control a robot hand and a robot arm of the robot based on a motion of a virtual object representing an estimate of a motion of the object such that the robot hand and the robot arm move indirectly based on the estimated motion of the object rather than directly to the instructions from the remote user via the movement of the master hand and the master arm, respectively, and the independent coordinate is configured to independently control a movement of the robot hand and the robot arm of the robot such that the robot hand and robot arm respond directly to the instructions from the remote user via the movement of the master hand and the master arm, respectively, and
  - control a movement of the robot hand and the robot arm of the robot based on the selected coordinate and instructions received from the remote user of the robot.

16. The grip control device according to claim 15, further comprising:
- a coordinate transformation unit configured to calculate a position of the virtual object on the object-based coordinate, and deliver information about the position and the direction of the virtual object calculated to the grip control unit.

17. A method of controlling a robot via master device including a master hand and a master arm controlled by a remote user, the method comprising:
- determining, by a processor, whether a robot hand of the robot grips an object at a sufficient force to hold the object;
- selecting, by the processor, according to a result of the determination, one of two coordinate systems to utilize to control the robot hand and the robot arm based on whether the determining determines that robot hand is gripping the object at the sufficient force, the two coordinate systems including an object-based coordinate and an independent coordinate, the object-based coordinate configured to control the robot hand and a robot arm of the robot based on a motion of a virtual object representing an estimate of a motion of the object such that the robot hand and the robot arm move indirectly based on the estimated motion of the object rather than directly to the instructions from the remote user via the movement of the master hand and the master arm, respectively, and the independent coordinate independently controls the hand and the arm such that the robot hand and robot arm respond directly to the instructions from the remote user via the movement of the master hand and the master arm, respectively; and
- controlling, by the processor, the robot hand and the robot arm based on the selected coordinate and instructions received from the remote user of the robot.

* * * * *